March 8, 1966 R. M. ELLIOTT ETAL 3,239,808

RECORD ANALYZING APPARATUS

Filed July 29, 1958 3 Sheets-Sheet 1

RECORD ANALYZING APPARATUS

March 8, 1966 R. M. ELLIOTT ETAL 3,239,808

RECORD ANALYZING APPARATUS

Filed July 29, 1958 3 Sheets-Sheet 3

United States Patent Office 3,239,808 Patented Mar. 8, 1966

3,239,808

RECORD ANALYZING APPARATUS

Richard M. Elliott, Beverly, William B. Longval, Salem, and William B. Mercaldi, Beverly, Mass., assignors to Kimball Systems, Inc., a corporation of New York Filed July 29, 1958, Ser. No. 751,787
6 Claims. (Cl. 340—146.1)

This invention relates to improvements in apparatus for analyzing records having data encoded therein. More particularly, the invention relates to improvements in apparatus for analyzing such records and for controlling the operation of secondary devices according to the data analyzed. Such secondary devices may include, for example, card reproducers, tabulators, high speed printers, and other high speed devices utilized in the data processing field.

The invention is illustrated as embodied in apparatus of the type disclosed in an application for United States Letters Patent, Serial No. 684,525, filed September 17, 1957, in the name of Robert K. Jenner, Jr., now Patent No. 2,973,142. The apparatus disclosed in said application includes means for transporting record cards to a sensing station and means operative at said station for sensing data encoded in the cards and for controlling thereby the operation of groups of relays having their contacts connected in pyramid networks to form in each network a connection between a first terminal and one of a plurality of other terminals in accordance with the data sensed from the card, there being one pyramid network for each datum location in the card in which a numeral is encoded in multi-position code. In the apparatus disclosed in said application, branches of the pyramid networks which would be selected only in error corresponding to an improper code designation are connected with an error checking circuit which is rendered effective after sensing to insure that the circuits established by the pyramid network do not correspond to an improper code designation in the datum location of the card. For this purpose, branches of the pyramid network not corresponding to valid combinations are brought out to an error check line and an error check is made by connecting each pyramid network in a testing circuit which indicates the connection of a circuit through a network to one of the invalid branches. While this means of checking for errors in the operation of the pyramid network and the validity of the card code has worked well in practice, it does not indicate the presence of an error arising by reason of failure of the pyramid network, in selecting a branch corresponding to a valid code designation, to complete a through circuit as the result, for example, of an ineffective connection such as might be produced by foreign matter between a set of contacts in the network.

It is accordingly an object of the present invention to provide, following each sensing operation, a "positive error check" of each operational pyramid network which will indicate failure of the connecting means to establish a complete electric circuit from the first terminal of each network through to another terminal or branch corresponding to a valid code designation.

To this end and in accordance with a feature of the invention, means are provided for connecting together all other terminals of each pyramid network corresponding to valid code designations and for connecting each network in a testing circuit effective to indicate the presence of an open circuit between the first terminal of any network and its interconnected other terminals. If an open circuit is found through any one of the networks, an indication of error is made and in the illustrative embodiment such error is indicated by de-energizing the relays of the pyramid networks and by stopping the operation of the apparatus in feeding and sensing further records.

The apparatus disclosed in the Jenner application is adapted for the analysis of record cards coded in multi-position code of the 4-bit type in which each numeral is represented by indicia, specifically holes, at one or two index points of a four index point datum area of the record card. As is well known in the art, mistakes in the preparation or sensing of records so encoded may be detected in substantially every case by the use of a fifth or check-index point associated with each datum area comprising the four index points in which the numeral-representing indicia are located, the fifth index point, or so-called "check-bit," being employed by including in the check-index point an indicium whenever only one indicium appears in the corresponding datum area. No indicium is employed in the check-index point when two indicia appear in the datum area. Accordingly, if a check indicium is sensed at the check-index point where two indicia are sensed in the associated datum area, an error is represented which may be indicated by suitable means controlled by the sensing means. While the use of such 5-bit coded records is advantageous, not all record cards include the additional fifth or check-bit and it is frequently found in commercial use that records encoded in 5-bit code are intermixed with records encoded in the 4-bit code.

Accordingly, it is another object of the invention to provide apparatus for analyzing records encoded in either the 4-bit multi-position code or in the 5-bit multi-position code which includes a check-bit.

To this end and in accordance with a feature of the invention, each pyramid network includes code selector switching means whereby the branches of the networks corresponding to data or numeral designations for which a check-bit indicium is appropriate are interrupted in response to the sensing, from a control column of the record, of a designation identifying the record as one encoded with 5-bit code while check-bit switching means are operated in response to the sensing of indicia in check-index points to reclose, in the networks corresponding to the associated datum areas, the branches opened by the code selector switching means and to open the branches corresponding to data designations for which a check indicium is not appropriate.

In accordance with a further feature of the invention, the check-bit circuitry of each pyramid network is connected with the error check circuit after each sensing to provide an indication of errors represented by the improper presence or absence of an indicium in a check-index point.

Other features and advantages of the invention will be best understood from the following description taken in conjunction with the accompanying drawings, in which, FIG. 1 is a side elevation of the record feeding and sensing mechanisms of analyzing apparatus embodying the present invention with a portion of a side wall broken away;

Figures 1, 2:
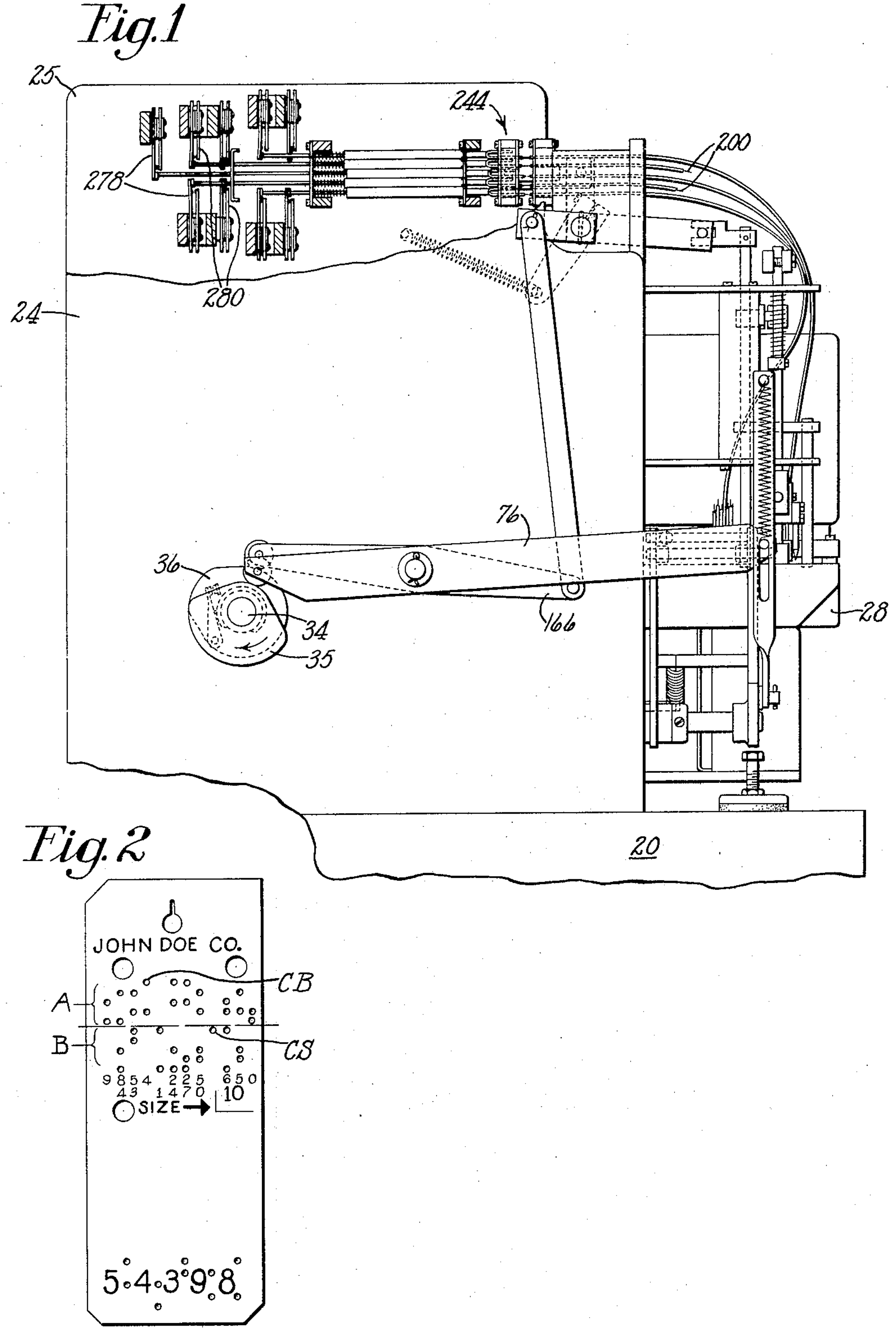
FIG. 2 is a view of a typical check-bit code record or tag to be analyzed.

The record analyzing and secondary device controlling apparatus embodying the present invention is substantially similar in its general arrangement to that disclosed in the above-mentioned Jenner patent and accordingly only sufficient description will be provided herein of the apparatus as will be necessary to an understanding of the present invention. As far as possible, reference numerals applied to elements disclosed herein are similar to those applied to corresponding elements shown in the Jenner application to which reference may be had for a more complete description of the general arrangement and operation of the apparatus.

Thus referring to FIG. 1, the apparatus embodying the present invention comprises a base plate 20 from which rises a box-like frame consisting of a forward wall and two side walls 24 and 25. Fixed to the forward wall is a bracket 28 which supports a table plate along which record cards are moved toward the reader from a magazine, through a pre-read station, to a reading or sensing station and thence to a tag receiver.

For driving the tag feeding and sensing mechanisms, the tag reader is provided with a motor (not shown) which is connected through a one-revolution clutch to a cam shaft 34 journaled in the side walls 24 and 25. Upon energization of a clutch magnet TC indicated in FIG. 3, the clutch is engaged for one revolution of the shaft 34 to rock, by means of cams 35 and 36, the levers 76 and 166 to actuate the tag transporting and sensing mechanisms.

While each tag is positioned in the sensing station, information encoded therein in the form of holes at index points is sensed by resiliently urging a Bowden wire 200 against the card at each index point. During the cycle of rotation of the shaft 34, an oscillating unit 244 is moved forwardly and the Bowden wires are urged down to probe the tag. Where a hole is present at an index point in the tag, a Bowden wire passes through the hole allowing contacts 278 of sets of sensing contacts, one set being associated with each wire, to engage contacts 280. Thus for each hole punched at an index point in the tag a set of contacts is closed during the sensing portion of the operating cycle for establishing control circuits, as will hereinafter appear.

FIG. 2 illustrates a typical merchandise tag perforated in 5-bit multi-position or check-bit code. As therein illustrated, the tag area includes a plurality of index points arranged in 29 columns of five index points. Each column comprises a datum area of four index points in which is encoded the numeral designation comprising one or two holes, and a check-index point at which is punched a hole when the numeral designation comprises only one hole. Thus in the upper row of 12 columns, the vertical scope of the columns within the bracket designated A is the datum area, while above the datum areas are check-index points. It will be seen, for example in the fourth column, that a hole CB is punched at each check-index point where the associated datum area is punched with only one hole. Below the tag area encompassed by the bracket A appear 12 more columns of data. The heightwise scope of the numeral designation datum areas is indicated by the bracket B. Below these areas are the associated check-index points several of which are punched inasmuch as the associated datum areas carry only one hole. At the bottom of the tag five further columns are similarly punched in 5-bit code. There will be observed in FIG. 1 that an additional Bowden wire and set of sensing contacts for each check-index point has been added to the apparatus as disclosed in FIG. 3 of the Jenner application.

Referring again to FIG. 2, it will be seen that the twenty-first column has a hole CS punched in the #1 index point of the datum area but has no check-bit hole punched in the check-index point. This column is used as a code selector control area wherein a hole at the #1 index point identifies the tag as a tag encoded in check-bit or 5-bit code rather than 4-bit code. As will later appear, the corresponding #1 set of sensing contacts of the apparatus is connected in a circuit for controlling the apparatus so that upon sensing a hole in this position it is adapted to analyze the card in terms of 5-bit code. The other sets of the group associated with the control column are not used. Any column and any or several index points could be used for the identifying or control designation if desired. If more than one index point is used, the contact sets may be connected in parallel.

Figure 3:
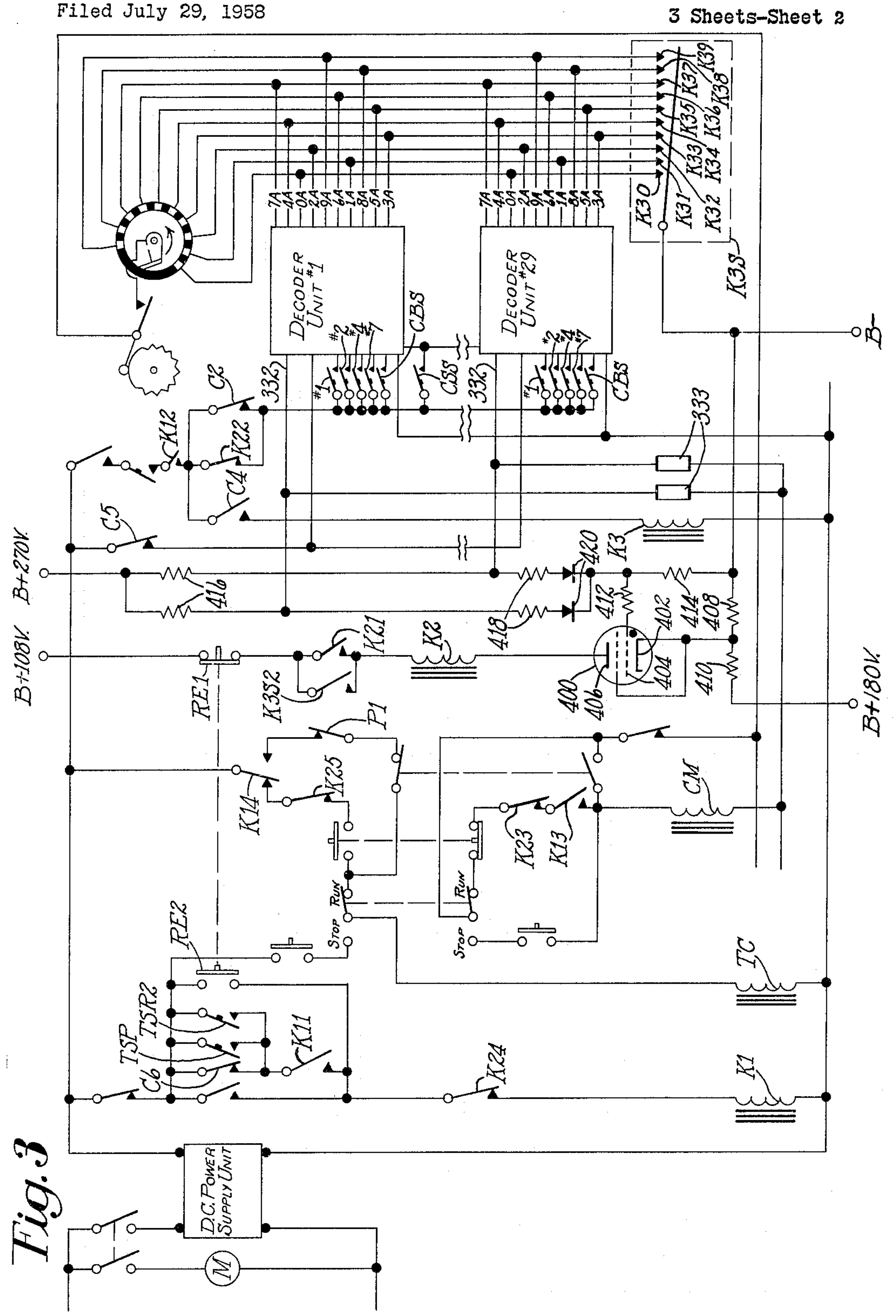
FIG. 3 is a schematic of the electric circuits of the apparatus embodying the present invention.
Figure 4:
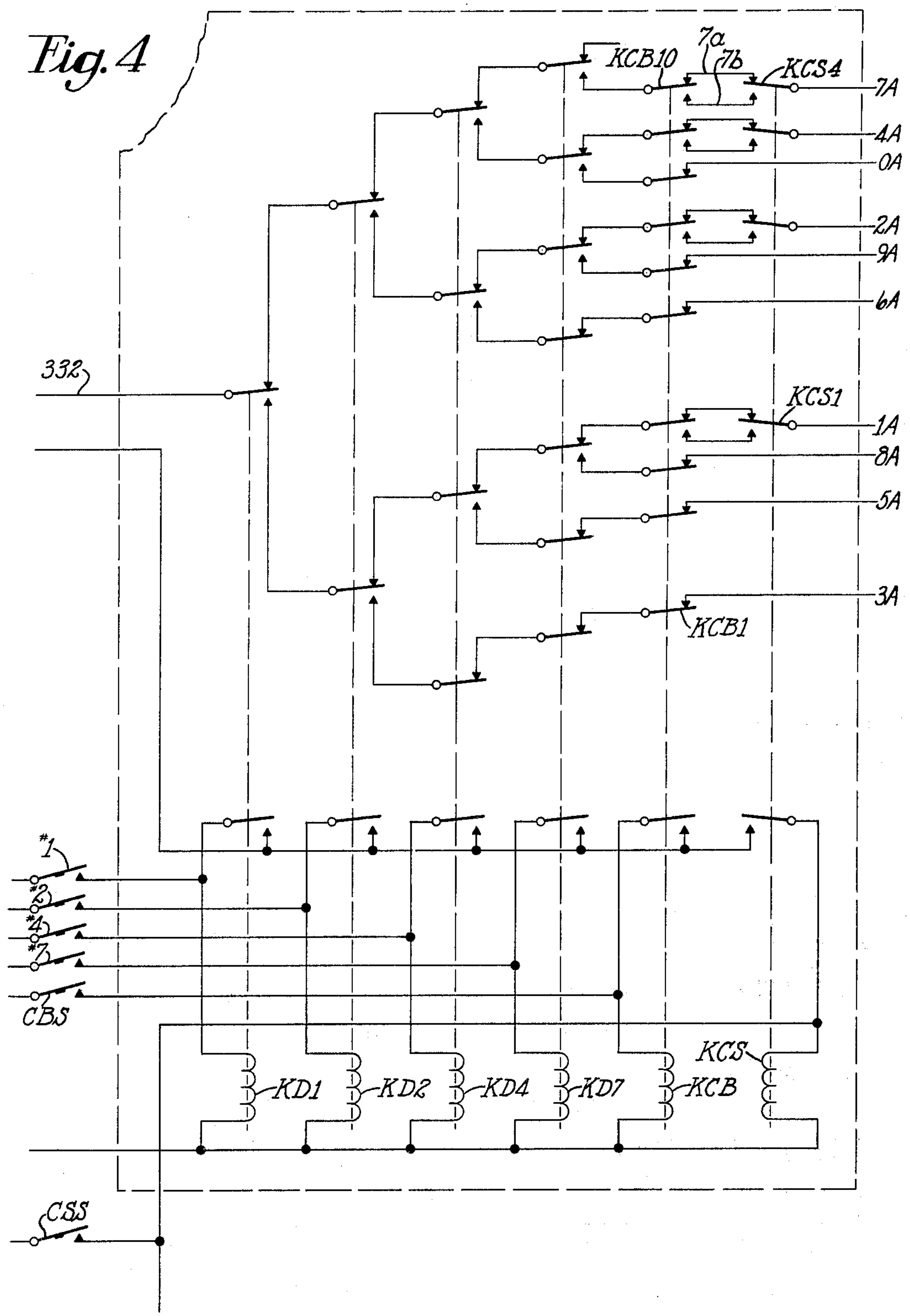
FIG. 4 is a schematic of a circuit portion shown in block form in FIG. 3.

FIG. 3 is a schematic diagram illustrating the circuits of the apparatus embodying the present invention as connected for operating a secondary device, in this case the card reproducing machine disclosed in the Lake Reissue Patent No. 21,133, in the same manner as disclosed in the aforesaid Jenner application. As shown in the Jenner application, a decoder unit controlled by a group of sensing contacts (#1, #2, #4, and #7) is provided for each numeral bearing column to be sensed in the tag. As indicated in FIGS. 3 and 4, there will be five sets of contacts, including set CBS, associated with each decoder for the purpose of interpreting 5-bit code. As shown in FIG. 4, each decoder unit comprises a relay-operated pyramid network in which relays controlled by the sensing contacts operate to connect a first terminal 332 to one of a plurality of other terminals 0A–9A. In addition to the four relays KD1, KD2, KD4 and KD7 corresponding to the index points #1, #2, #4 and #7 of the datum area, an additional relay KCB is connected for control by the sensing contacts CBS operated by the Bowden wire engaging the tag at the check-index point associated with the datum area. Energization of the relay KCB operates to open any circuit established from 332 to those of the other terminals or branches corresponding to numerals represented by two holes in the datum area, namely 0A, 9A, 6A, 8A, 5A and 3A. In the case of the other terminals corresponding to single hole numerals, 1A, 2A, 4A and 7A, energization of the relay KCB is effective to open the normal circuit to these other terminals, for example, via *7a*, but establishes a parallel path, for example, *7b* if a relay KCS is energized. This relay KCS, the code selector relay, is energized in all decoding units when a hole appears in the number one or other selected index point of the control column by closure of the corresponding set of sensing contacts shown as switch CSS in FIG. 4. Energization of the relay KCS operates the arms KCS1–KCS4 interrupting the normal or "*a*" paths of branches corresponding to a numbered designation for which a check bit is appropriate, and connecting the branch or terminal to the "*b*" path.

In order to detect and indicate the presence in any decoding unit of an open circuit between the first terminal 332 and any one of the other terminals 0A–9A corresponding to a valid code designation, means are provided for testing each decoder unit for an open circuit through the pyramid network to such other terminals. As shown in FIG. 3, the error relay K3, which is energized through the error relay power switch C4 which is closed by a cam (not shown) for a brief period following sensing of a tag as described in the Jenner application, operates a switch K3S having a plurality of contacts K30–K39 to connect all of the "other" terminals of the operational decoder units together and to connect the decoders in a testing circuit for electrical continuity through the decoders from the first terminals to the other terminals, the testing circuit being effective to indicate the presence of an open circuit through any decoder unit. For this purpose a thyratron 400 having a cathode 402, a control grid 404, and a plate 406 is connected to control the energization of the relay K2 from a source of plate supply voltage indicated by the B+ and B− terminals, the energizing circuit for the relay K2 extending from the B+ terminal through the reset switch RE1, parallel normally open sets of contacts K3S2 and K21, relay K2 to the plate 406, to the cathode 402, and through a resistor 408 (value 1K) to the B− terminal. The grid 404 is biased negative with respect to the cathode 402 by the connection of the latter to a voltage dividing network across the B supply, the network comprising a resistor 410 and the resistor 408. The grid 404 is connected to the B− terminal through resistors 412 and 414. Energization of the error relay K3 not only connects together all the other terminals of the decoding units but also connects these units to the B— terminal of the testing circuit and closes contacts K3S2 to apply plate voltage to the thyratron 400. The first terminal 332 of each decoder unit or pyramid network is connected through a resistor 416 (value 1 megohm) to a source of positive potential somewhat higher than the plate supply potential, and each terminal 332 is also connected through a 10 megohm resistor 418 and a diode 420 to the junction of the resistors 412 and 414. Accordingly, when the contacts K30–K39 are engaged by the bar of switch K3S in response to the closure of the switch C4 and the energizing of the coil K3, all terminals 332 of decoder units having a through circuit from terminal 332 to another terminal corresponding to a valid data representation are at the B— potential while any terminal 332 of a decoder unit in which there is no such through circuit is at a fairly high positive potental. If any terminal 332 is at such a positive potential, current flows through the corresponding resistor 414 to the B— supply terminal thereby raising the potential on the grid 404 to the firing potential so that the thyratron 400 conducts plate current to energize the relay K2. It is advantageous to employ the diodes 420 in the aforesaid circuit to prevent back flow of current through the decoder units with closed networks which flow would cause unnecessary loading of the error circuit.

Upon energization of the relay K2, relay contacts K22, K23, K24 and K25 are opened while contacts K21 are closed. Upon energization of the relay K2, the normally closed relay contacts K24 open de-energizing the control relay K1. When the relay K1 is de-energized, the contactor K14 is transferred to the left to the position shown in FIG. 3 opening the circuit to the cam contact P1 so that the tag reader clutch magnet TC will not be energized at the end of the card punching cycle. The relay contacts K11 are also opened preventing subsequent operation of the holding circuit to the relay K1 through the cam switch C6, tag sensing switches TSP, or TSR2. The contacts K13 and K23 are also opened preventing energization of the card punch clutch magnet CM. The contacts K12 are also opened opening the circuits leading through cam switch C2 to the sensing switches de-energizing the decoding relays and also opening the circuit through the cam switch C4 to the relay K3 which then opens contacts K3S2 while the relay K2 holds through its contacts K21.

When the cam switch C5 is closed during the remainder of the tag reader cycle, all the decoding relays have been de-energized due to the opening of the contacts K12 so that no decoded information is stored in the decoding units. Thus, during the card punch cycle, the punch magnets 333 are not energized and a card corresponding to the tag having an error is fed without being punched. The error tag just sensed is also fed to the receiver and a new tag is fed to the read station during the remaining portion of the tag reader cycle. The error relay K2 remains energized until in recommencing the automatic operation of the tag reader and card punch the operator depresses the reset switch RE1 and RE2, the opening of RE1 interrupting the supply of plate voltage to the thyratron 400 whose grid 404 thereafter regains control to hold the thyratron nonconductive.

Thus an error represented by an open circuit in any decoding unit is indicated to the operator by the stopping of the operation of the reader and by the production of a blank card in the secondary device. If desired, the energization of relay K2 may be arranged to effect the illumination of an error-indicating light.

Having thus described our invention, what we claim as new and desire to secure by Letters Patent of the United States is:

1. In apparatus for analyzing records having data encoded therein as data-representing designations, means operable at a sensing station to sense data encoded in a record positioned at said station, a pyramid network having a first terminal and a plurality of other terminals, means controlled by said sensing means for operating said pyramid network to connect said first terminal selectively with one of said plurality of other terminals in accordance with the data sensed from the record, means operable to connect said other terminals together and to connect said pyramid network in a testing circuit for electrical continuity through said network from said first terminal to the other terminals, and means controlled by said testing circuit and effective to render inoperative the means for operating said pyramid network in response to the existence of an open circuit through said pyramid network from said first terminal to said other terminals.

2. In apparatus for analyzing records having data encoded therein as data-representing designations, in combination, sensing means including a plurality of sets of electric contacts operable at a sensing station to sense data encoded in a record positioned at said station selectively to close said contacts in accordance with the data sensed from the record, a plurality of relays having contacts connected in a pyramid network and controlled by said sensing means for connecting a first terminal of said network to one of a plurality of other terminals in accordance with the data sensed from said record, means operable to connect said other terminals together, and means for connecting said pyramid network in a circuit effective to de-energize said relays in response to the existence of an open circuit through said network from said first terminal to said other terminals.

3. In apparatus for analyzing records having data encoded therein in multi-position code wherein each data-representing designation comprises one or two indicia located in a datum area at predetermined index points in the record and wherein records having identifying designations in a control area have in association with datum areas additional check index points at each of which is recorded an indicium if only one indicium appears in the corresponding datum area comprising, in combination, means operable at a sensing station for sensing data recorded in a record, circuit means controlled by said sensing means in accordance with the data sensed from a datum area in the record for connecting a first terminal of said network to one of a plurality of other terminals in accordance with such data, and code selector means and check bit means controlled by said sensing means in accordance respectively with control and check designations in the record, operative cooperatively to interrupt the electric path from the first terminal to the other terminal selected in accordance with the data designation in said datum area where the control designation indicates that the record is encoded in check bit code and the check designation is inappropriate to the data designation.

4. In apparatus for analyzing records having data encoded therein in multi-position code wherein each data-representing designation comprises one or two indicia located in a datum area at predetermined index points in the record and wherein records having identifying designations in a control area have in association with datum areas additional check index points at each of which is recorded an indicium if only one indicium appears in the corresponding datum area comprising, in combination, means operable at a sensing station for sensing data recorded in a record, circuit means controlled by said sensing means in accordance with the data sensed from a datum area in the record for connecting a first terminal of said network to one of a plurality of other terminals in accordance with such data, code selector means controlled by said sensing means in response to a designation in a control area of the record identifying it as one encoded with 5-bit code for interrupting the electric path from said first terminal to those other terminals corresponding to designations for which a check bit indicium is appropriate, and means controlled by the sensing means in response to the sensing of an indicium in another area of the record for reclosing the paths interrupted by the code selector means and for interrupting the electric paths to terminals corresponding to designations for which a check indicium is not appropriate.

5. In apparatus for analyzing records having data encoded therein in multi-position code wherein each data-representing designation comprises one or two indicia located in a datum area at predetermined index points in the record and wherein records having a check-bit identifying designation in a control area have in association with datum areas additional check index points at each of which is recorded an indicium if only one indicium appears in the corresponding datum area comprising, in combination, means operable at a sensing station for sensing data recorded in a record, circuit means controlled by said sensing means in accordance with the data sensed from a datum area in the record for connecting a first terminal of said circuit means to one of a plurality of other terminals in accordance with such data, code selector means controlled by said sensing means in response to a designation in a control area of the record identifying it as one encoded with check-bit code for interrupting the electric path from said first terminal to those other terminals corresponding to designations for which a check bit indicium is appropriate, means controlled by the sensing means in response to the sensing of an indicium in a check index point associated with said last datum area for reclosing the paths interrupted by the code selector means and for interrupting the electric paths to terminals corresponding to designations for which a check indicium is not appropriate, and means connected with said circuit means for connecting said other terminals together and for connecting said circuit means in a testing circuit effective to indicate the existence of an open circuit through said circuit means between said first terminal and said other terminals.

6. In apparatus for analyzing records having data encoded therein in multi-position code wherein each data-representing designation comprises one or two indicia located in a datum area at predetermined index points in the record and wherein records having a check-bit code identifying designation in a control area have in association with datum areas additional check index points at each of which is recorded an indicium if only one indicium appears in the corresponding datum area comprising, in combination, means operable at a sensing station for sensing data recorded in a record, circuit means controlled by said sensing means in accordance with the data sensed from a datum area in the record for connecting a first terminal of said circuit means to one of a plurality of other terminals in accordance with such data, code selector means controlled by said sensing means in response to a designation in a control area of the record identifying it as one encoded with check-bit code for interrupting the electric path from said first terminal to those other terminals corresponding to designations for which a check bit indicium is appropriate, means controlled by the sensing means in response to the sensing of an indicium in a check index point associated with said last datum area for reclosing the paths interrupted by the code selector means and for interrupting the electric paths to terminals corresponding to designations for which a check indicium is not appropriate, and means connected with said circuit means and operable to test the integrity of the electric circuit between said first terminal and said other terminals and to indicate the failure of said circuit means to form a circuit between said first terminal and at least one of said other terminals.

References Cited by the Examiner

UNITED STATES PATENTS

| | | | |
|---|---|---|---|
| 2,279,009 | 4/1942 | Nichols | 340—147 |
| 2,387,850 | 10/1945 | Loughridge | 340—147 |
| 2,484,226 | 10/1949 | Holden | 340—147 |
| 2,576,099 | 11/1951 | Bray et al. | 340—347 |
| 2,614,632 | 10/1952 | Clos | 340—174 X |
| 2,635,135 | 4/1953 | Lamont | 324—52 X |
| 2,651,461 | 9/1953 | Luhn | 235—61.11 |
| 2,693,593 | 11/1954 | Crosman | 340—347 |
| 2,822,980 | 2/1958 | Roth | 235—61.11 |
| 2,851,660 | 9/1958 | Tobin | 324—52 X |
| 2,871,289 | 1/1959 | Cox et al. | 340—146.1 |
| 2,896,844 | 7/1959 | Roth | 235—61.11 X |
| 2,909,768 | 10/1959 | Kautz | 340—147 X |
| 2,909,995 | 10/1959 | Hannibal | 340—146.1 |
| 2,917,730 | 12/1959 | Fredericks | 340—253 X |
| 2,973,142 | 2/1961 | Jenner | 340—347 X |

ROBERT C. BAILEY, *Primary Examiner.*

LEO SMILOW, EVERETT R. REYNOLDS, MALCOLM A. MORRISON, STEPHEN W. CAPELLI, *Examiners.*